USO08866709B2

(12) United States Patent
Toyooka

(10) Patent No.: US 8,866,709 B2
(45) Date of Patent: Oct. 21, 2014

(54) PROJECTION DISPLAY APPARATUS AND PROJECTION DISPLAY METHOD

(75) Inventor: Takashi Toyooka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1863 days.

(21) Appl. No.: 11/905,461

(22) Filed: Oct. 1, 2007

(65) Prior Publication Data
US 2008/0084510 A1 Apr. 10, 2008

(30) Foreign Application Priority Data

Oct. 6, 2006 (JP) .................................. 2006-275042

(51) Int. Cl.
G09G 3/34 (2006.01)
H04N 9/31 (2006.01)

(52) U.S. Cl.
CPC ........... *H04N 9/3197* (2013.01); *H04N 9/3194* (2013.01); *H04N 9/3155* (2013.01)
USPC ................................. 345/87; 345/55; 345/204

(58) Field of Classification Search
USPC ............................................. 345/87, 55, 204
See application file for complete search history.

(56) References Cited

U.S. PATENT DOCUMENTS

| 6,894,697 | B2 | 5/2005 | Matsuda |
| 7,099,555 | B2* | 8/2006 | Onuki et al. ................. 385/147 |
| 7,683,857 | B2 | 3/2010 | Yoshida |
| 2004/0257537 | A1* | 12/2004 | Bierhuizen et al. ............ 353/31 |
| 2006/0192899 | A1* | 8/2006 | Ogita ............................ 348/744 |
| 2010/0149495 | A1 | 6/2010 | Yoshida |

FOREIGN PATENT DOCUMENTS

| JP | A 11-065528 | 3/1999 |
| JP | A 2002-031846 | 1/2002 |
| JP | A-2002-041016 | 2/2002 |
| JP | A-2004-354882 | 12/2004 |
| JP | A-2005-055760 | 3/2005 |
| WO | WO 03/032080 A1 | 4/2003 |

* cited by examiner

Primary Examiner — William Boddie
Assistant Examiner — Leonid Shapiro
(74) Attorney, Agent, or Firm — Oliff PLC

(57) ABSTRACT

Display an image by adjusting upper limit of brightness of the image projection light. Here, determine the target value, according to analysis result of the image data, for the detected brightness of the image projection light, and adjust the upper limit of brightness of the image projection light to cause the detected brightness to approach the target value.

12 Claims, 14 Drawing Sheets

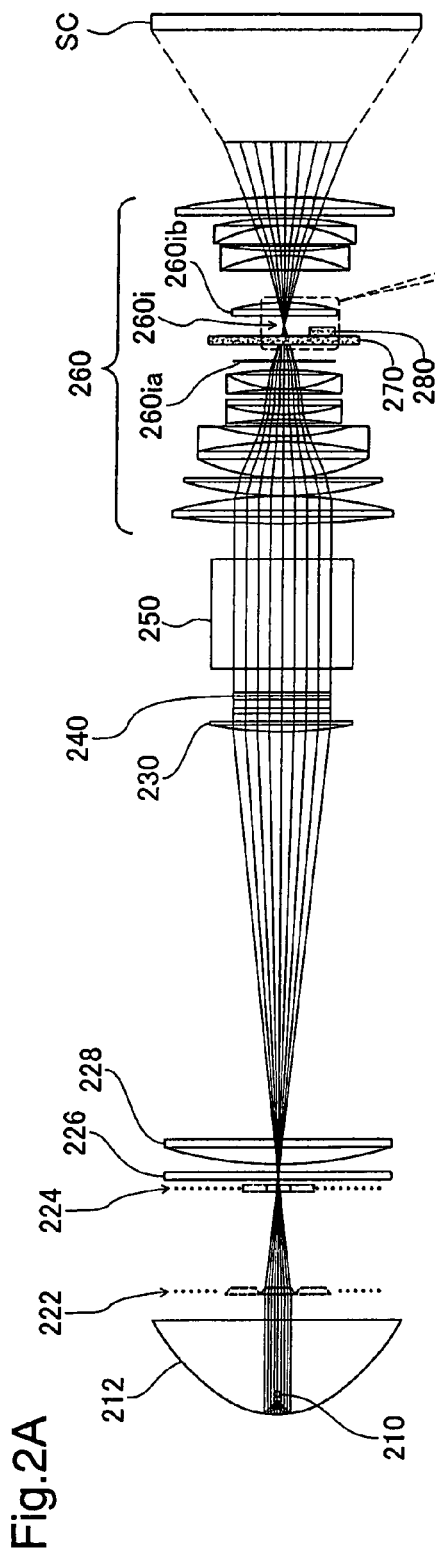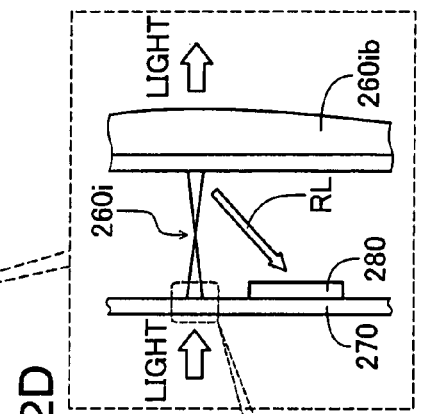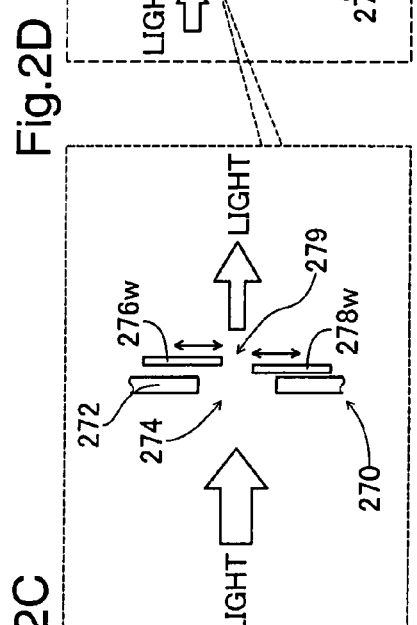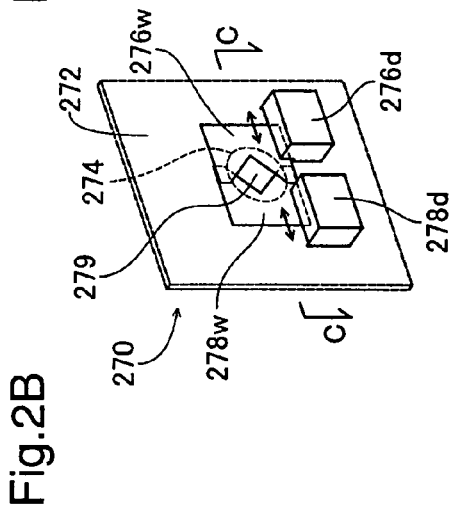

Fig.10 THIRD EMBODIMENT

PROJECTION DISPLAY APPARATUS AND PROJECTION DISPLAY METHOD

CROSS-REFERENCE TO RELATED APPLICATIONS

The present application claims the priority based on Japanese Patent Application No. 2006-275042 filed on Oct. 6, 2006, the disclosure of which is hereby incorporated by reference in its entirety.

BACKGROUND

1. Technical Field

The present invention relates to a projection display apparatus and an image display method.

2. Related Art

Those projection display apparatuses are known which modulate light emitted from a light source using a light modulator such as a liquid crystal light valve or a digital micromirror device and display the image by projecting the modulated light. In addition, a technology for such projection display apparatuses is also known that changes the amount of light that is allowed to reach the light modulator in accordance with the image signal (see, for example, WO-03/032080, JP-A-11-65528, and JP-A-2002-31846).

However, sufficient technological consideration has not been given to the actual brightness of the modulated light.

SUMMARY

An object of the invention is to provide a technology that can change the light amount while taking into consideration the actual brightness of the modulated light.

In an aspect of the invention, a projection display apparatus that displays an image according to image data includes a light source, a spatial light modulator, a data adjuster, a light amount adjuster, a light sensor, an image analyzer, and a brightness restricting unit. The spatial light modulator is configured to modulate, according to given control data, light emitted from the light source into image projection light to project an image. The data adjuster is configured to generate the control data according to the image data. The light amount adjuster is configured to adjust an upper limit of brightness of the image projection light. The light sensor is configured to detect brightness of the image projection light adjusted by the light amount adjuster. The image analyzer is configured to analyze the image data and to determine, according to analysis result of the image data, a target value for the brightness detected by the light sensor. The brightness restricting unit is configured to control the light amount adjuster to cause the brightness detected by the light sensor to approach the target value.

According to this projection display apparatus, because the upper limit of the brightness of the image projection light is adjusted such that the brightness of the image projection light detected by the light sensor approaches the target value determined according to the image data, the light amount can be varied while taking into consideration the actual brightness of the modulated light.

The invention can be implemented in various forms including, for example, an image display method and apparatus, a computer program to implement the functions of such method or apparatus, a recording medium on which the computer program is recorded.

These and other objects, features, aspects, and advantages of the invention will become more apparent from the following detailed description of the preferred embodiments with the accompanying drawings.

BRIEF DESCRIPTION OF THE DRAWINGS

FIGS. 2A-2D are schematic diagrams showing the configuration of one embodiment of an optical system 200.

DETAILED DESCRIPTION OF EMBODIMENTS

The embodiments of the invention are described below in the following order.
A. First Embodiment
B. Second Embodiment
C. Third Embodiment
D. Fourth Embodiment
E. Fifth Embodiment
F. Variations

A. First Embodiment

A1. Configuration of the Apparatus

Figure 1:
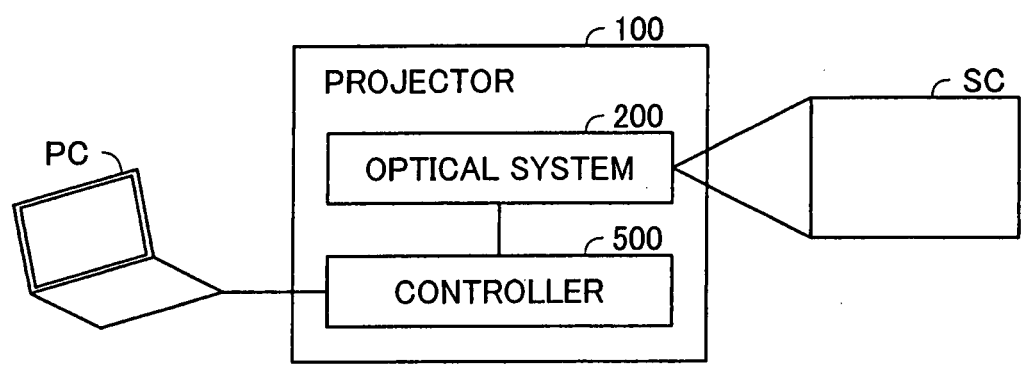
FIG. 1 is a drawing showing the configuration of a liquid crystal projector in an embodiment of the invention.

FIG. 1 is a drawing showing the configuration of a liquid crystal projector 100 in an embodiment of the invention. This liquid crystal projector 100 includes an optical system 200 that projects images onto a screen SC and a controller 500 that controls the optical system 200. The controller 500 controls the optical system 200 according to image signals input from an external apparatus (such as a personal computer PC) and displays on the screen SC images according to the image signals.

FIG. 2A is a schematic diagram showing one embodiment of the optical system 200. This optical system 200 includes a light source lamp 210, a concave mirror 212, a first lens array 222, a second lens array 224, a polarization conversion element 226, a superimposing lens 228, a field lens 230, a liquid crystal light valve 240 (hereinafter also referred to as simply the 'light valve 240' or 'liquid crystal panel 240'), a cross dichroic prism 250 (hereinafter also referred to as simply the 'prism 250'), a projection lens system 260, a partial blocking mechanism 270, and an illuminance sensor 280.

For the light source lamp 210, any of various types of light source lamps such as a high-pressure mercury lamp, a halogen lamp or a metal halide lamp may be used. The light source is not limited to these types of light source lamps 210, and any of various other types of light sources such as a light-emitting diode or a laser diode may be employed.

The light emitted from the light source lamp 210 is reflected by the concave mirror 212, and enters the entire surface of the first lens array 222 as almost parallel light. In the drawing, the light that passes through the center of the first lens array 222 is indicated using lines.

The multiple lenses 222-228 from the first lens array 222 through the superimposing lens 228 have the function of absorbing unevenness in the brightness of the image. Such lens systems are also termed 'integrators'.

The polarization conversion element 226 includes a polarizing beam splitter and a half-wave plate. The polarization conversion element 226 converts the light that enters it via the second lens array 224 into light that has a one-directional polarization plane.

The liquid crystal light valve 240 modulates the incident light into light to project the image (which corresponds to the 'image projection light' in the claims). In other words, the light valve 240 corresponds to the 'spatial light modulator' in the claims.

While omitted from the drawing, the optical element set including the field lens 230 through the light valve 240 is provided for each of color components of red (R), green (G) and blue (B). The light that leaves the superimposing lens 228 is broken down into RGB colored lights by a dichroic mirror not shown, and each colored light enters the respective optical element set including the field lens 230 through the light valve 240. The color components of the image projection light leaving the light valves 240 for the respective color components are synthesized by the prism 250, and the synthesized image projection light enters the projection lens system 260.

The projection lens system 260 includes multiple optical elements (such as lenses and filters) used to project the image projection light incoming from the prism 250 onto the screen SC. FIG. 2A shows the convergence point 260*i* of the projection lens system 260. The convergence point 260*i* indicates the position at which the image projection light converges. Such a convergence point 260*i* is often formed within the projection lens system 260 that projects the image projection light in enlargement. In the embodiment shown in FIG. 2A, the convergence point 260*i* is formed between two optical elements aligned sequentially along the light path (the two lenses 260*ia*, 260*ib* in this embodiment). The lens 260*ia* immediately in front of the convergence point 260*i* may also be referred to as the 'front lens 260*ia*' below. The lens 260*ib* immediately behind the convergence point 260*i* may be referred to as the 'back lens 260*ib*'.

The partial blocking mechanism 270 is disposed near the convergence point 260*i*. Specifically, the partial blocking mechanism 270 is disposed between the front lens 260*ia* and the back lens 260*ib*. An illuminance sensor 280 is disposed at a position between the partial blocking mechanism 270 and the back lens 260*ib* but away from the light path.

FIG. 2B is a perspective view of the partial blocking mechanism 270. FIG. 2C shows the C-C cross-section of the partial blocking mechanism 270 shown in FIG. 2B. This partial blocking mechanism 270 is an aperture mechanism that mechanically changes the aperture value. Specifically, this partial blocking mechanism 270 has a wall 272 having a hole 274 through which the light travels, two wings 276*w*, 278*w* slidable on the wall 272, a first wing drive unit 276*d* that drives the first wing 276*w*, and a second wing drive unit 278*d* that drives the second wing 278*w*. These wings 276*w*, 278*w* form an opening 279 that connects to the hole 274 by blocking part of the hole 274. The size of the opening 279 (the aperture value) changes in accordance with the positions of the wings 276*w*, 278*w*. The smaller the size of the opening 279, the larger the size of the area that is blocked by the wings 276*w*, 278*w* within the cross-section of the light path. By adjusting the size of the opening 279 in this way, the brightness of the image projection light that passes through the partial blocking mechanism 270 (the opening 279) is limited. The wing drive units 276*d*, 278*d* each include a galvanometer (motor) connected to the wings (omitted from the drawing). In this embodiment, by fully opening the opening 279, the image projection light passes through the partial blocking mechanism 270 without being blocked by the wings 276*w*, 278*w*.

FIG. 2D is an enlarged drawing of the components of the projection lens system 260 that are in the vicinity of the convergence point 260*i*. The light that has passed through the opening 279 of the partial blocking mechanism 270 (FIG. 2C) enters the back lens 260*ib*. A convergence point 260*i* is formed between the partial blocking mechanism 270 and the back lens 260*ib*. An illuminance sensor 280 is disposed between the partial blocking mechanism 270 and the back lens 260*ib*. This illuminance sensor 280 is disposed such that it receives reflected light RL from the back lens 260*ib*. The illuminance sensor 280 detects the illuminance of the image projection light whose light amount has been adjusted by the partial blocking mechanism 270, because this reflected light RL is light that has passed through the partial blocking mechanism 270. The position of the illuminance sensor 280 may be determined experimentally, because the position at which the reflected light RL from the back lens 260*ib* can be received changes depending on the configuration of the back lens 260*ib* and/or the configuration of the projection lens system 260.

Figure 3:
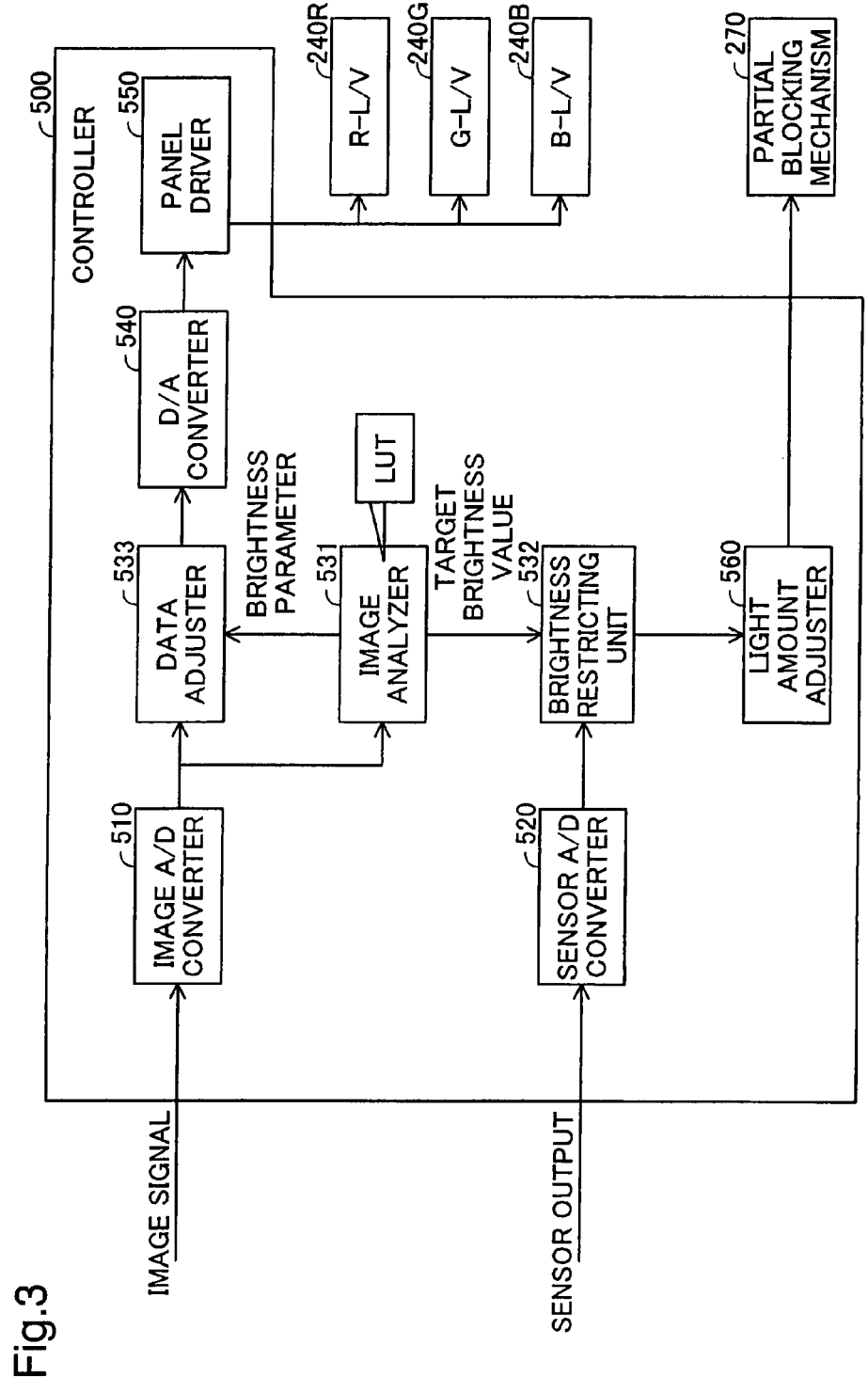
FIG. 3 is a drawing showing the internal configuration of controller 500.

FIG. 3 is a drawing showing the internal configuration of the controller 500. This controller 500 includes an image A/D converter 510, a sensor A/D converter 520, an image analyzer 531, a brightness restricting unit 532, a data adjuster 533, a D/A converter 540, a panel driver 550, and a light amount adjuster 560. Each component element of the controller 500 includes electronic circuitry. In addition, the component elements of the controller 500 are interconnected via a bus not shown.

The image A/D converter 510 converts analog image signals input from an external apparatus into digital image data. Various image data formats may be used, such as a format represented by tone values for RGB color components or a format represented by tone values for YCbCr components. Where the image signals input from an external apparatus include digital image data, the image A/D converter 510 may be omitted. The digital image data is supplied to the image analyzer 531 and the data adjuster 533. The image analyzer 531 calculates the brightness parameter and target brightness value by analyzing the digital image data. The brightness parameter indicates the brightness of the brightest part of the image. The target brightness value indicates the average brightness of the entire image. The data adjuster 533 executes image data brightness extension processing in accordance with the brightness parameter. Through this extension processing, panel control data having an intensified brightness is generated. The D/A converter 540 converts the panel control data into analog control data. The panel driver 550 controls the three liquid crystal light valves 240R, 240G, 240B (correspond to the liquid crystal light valve 240 in FIG. 2) according to the analog control data to modulate the colored lights. The three liquid crystal light valves 240R, 240G, 240B modulate the intensity of the colored lights at each pixel position in the image. The three light valves 240R, 240G, 240B respectively modulate the three colored lights or the RGB colored lights.

The sensor A/D converter 520 converts the analog output signal from the illuminance sensor 280 into digital sensor output data. The brightness restricting unit 532 controls the light amount adjuster 560 according to the sensor output data and the target brightness value received from the image analyzer 531. The light amount adjuster 560 controls the aperture value of the partial blocking mechanism 270 in accordance with an instruction from the brightness restricting unit 532. The wing drive units 276d, 278d in FIG. 2B are controlled by the light amount adjuster 560.

A2. Calibration Processing

Figure 4:
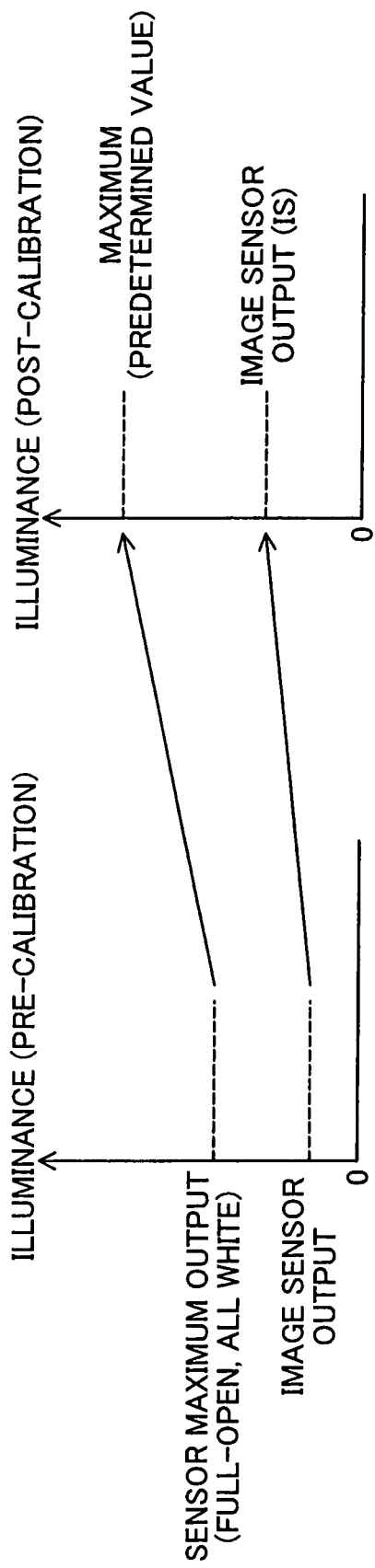
FIG. 4 is a schematic diagram showing calibration processing.

FIG. 4 is a schematic diagram showing calibration processing. This calibration processing is processing to normalize the sensor output data from the illuminance sensor 280 using the brightest sensor output data (hereinafter the sensor output data is also referred to as the 'illuminance value'). The brightest sensor output data is the sensor output data obtained when the aperture of the partial blocking mechanism 270 (FIG. 2B, 2C) is fully open and the three liquid crystal light valves 240R, 240G, 240B are displaying an all-white image. The all-white image is an image in which all pixels are showing the brightest white.

As shown in FIG. 4, in the calibration processing, the sensor output data is normalized such that the brightest sensor output data (hereinafter also referred to as the 'sensor maximum output') becomes a predetermined maximum value. Through this normalization, the range of values of the post-calibration sensor output data comes to be a range from zero to the predetermined maximum value.

In this embodiment, this calibration processing is executed in accordance with an instruction from the brightness restricting unit 532 (FIG. 3). The brightness restricting unit 532 outputs to the panel driver 550 an instruction to display the all-white image and an instruction to the light amount adjuster 560 to fully open the aperture. As a result, the amount of light that enters the back lens 260ib (FIG. 2A) becomes the maximum. The brightness restricting unit 532 then instructs the sensor A/D converter 520 to carry out A/D conversion calibration such that the current sensor output data becomes a predetermined maximum value. The range of values of the sensor output data output from the sensor A/D converter 520 thereby comes to be a range from zero to the predetermined maximum value.

This calibration processing is executed in order to perform the brightness restriction processing, described below, according to a value (output data) relative to the actually-usable maximum value of the light amount. As a result, the upper limit of the brightness of the image projection light can be adjusted appropriately with reference to the actually-usable maximum value, even if the actually-usable maximum value of the light amount is not constant because of individual differences and/or changes over time in the liquid crystal projector 100 (especially the light source, liquid crystal panels and partial blocking mechanism). Where fluctuation in the actually-usable maximum value of the light amount is small, the calibration may be omitted.

Various types of processing can be used to normalize the sensor output data using the maximum sensor output. For example, the gain of the input signal amplifier (not shown) disposed in the sensor A/D converter 520 may be adjusted. It is also acceptable if the brightness restricting unit 532 corrects the sensor output data. For example, the value that is obtained by multiplying the post-A/D conversion digital data by a coefficient may be used by the brightness restricting unit 532 as the sensor output data, where the coefficient is set such that the sensor maximum output becomes a predetermined maximum value.

In addition, the calibration processing may be executed at any time. For example, the calibration processing may be executed when the liquid crystal projector 100 is booted. In this way, compensation may be made for changes over time in the liquid crystal projector 100 performance, such as fluctuations in brightness of the light source lamp 210 (FIG. 2A). It is also acceptable that the calibration processing is executed when switching among the various operation modes of the liquid crystal projector 100 (such as the image adjustment mode). In this way, calibration can be carried out without causing the user to be aware of the execution thereof. In any case, the brightness restricting unit 532 may automatically execute the calibration processing. It is also acceptable that the brightness restricting unit 532 begins the calibration processing responsive to an instruction from the user.

Figure 5:
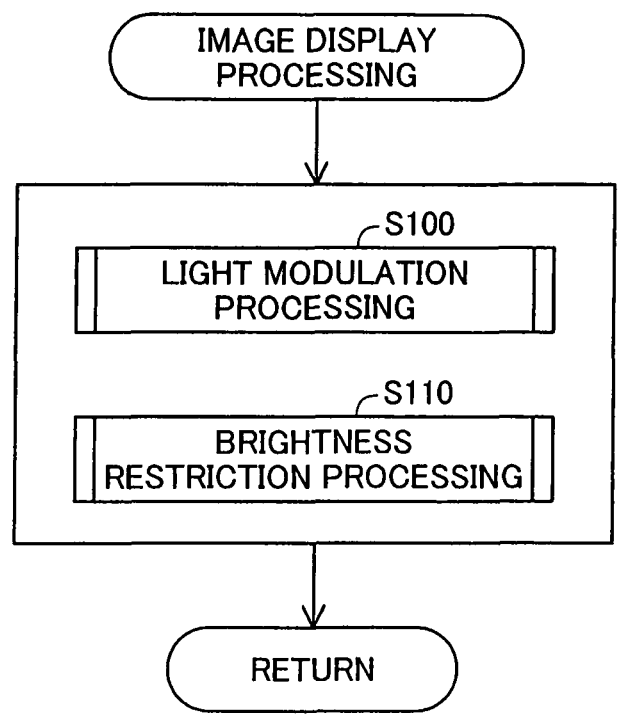
FIG. 5 is a flow chart showing the sequence of operations of image display processing in the first embodiment.

A3. Light Modulation Processing and Brightness Restriction Processing in First Embodiment FIG. 5 is a flow chart showing the sequence of image display processing in the first embodiment. In this image display processing, the image is displayed on the screen SC while the aperture of the partial blocking mechanism 270 (FIG. 2) is adjusted in accordance with the image data. This image display processing is begun, for example, in response to the input of image signals from an external apparatus.

When image display processing is begun, light modulation processing (step S100) and brightness restriction processing (step S110) are executed. These routines are executed in parallel. As a result of these routines, an image is displayed on the screen SC (FIG. 1). These routines are repeatedly executed each time the image to display changes.

Figure 6:
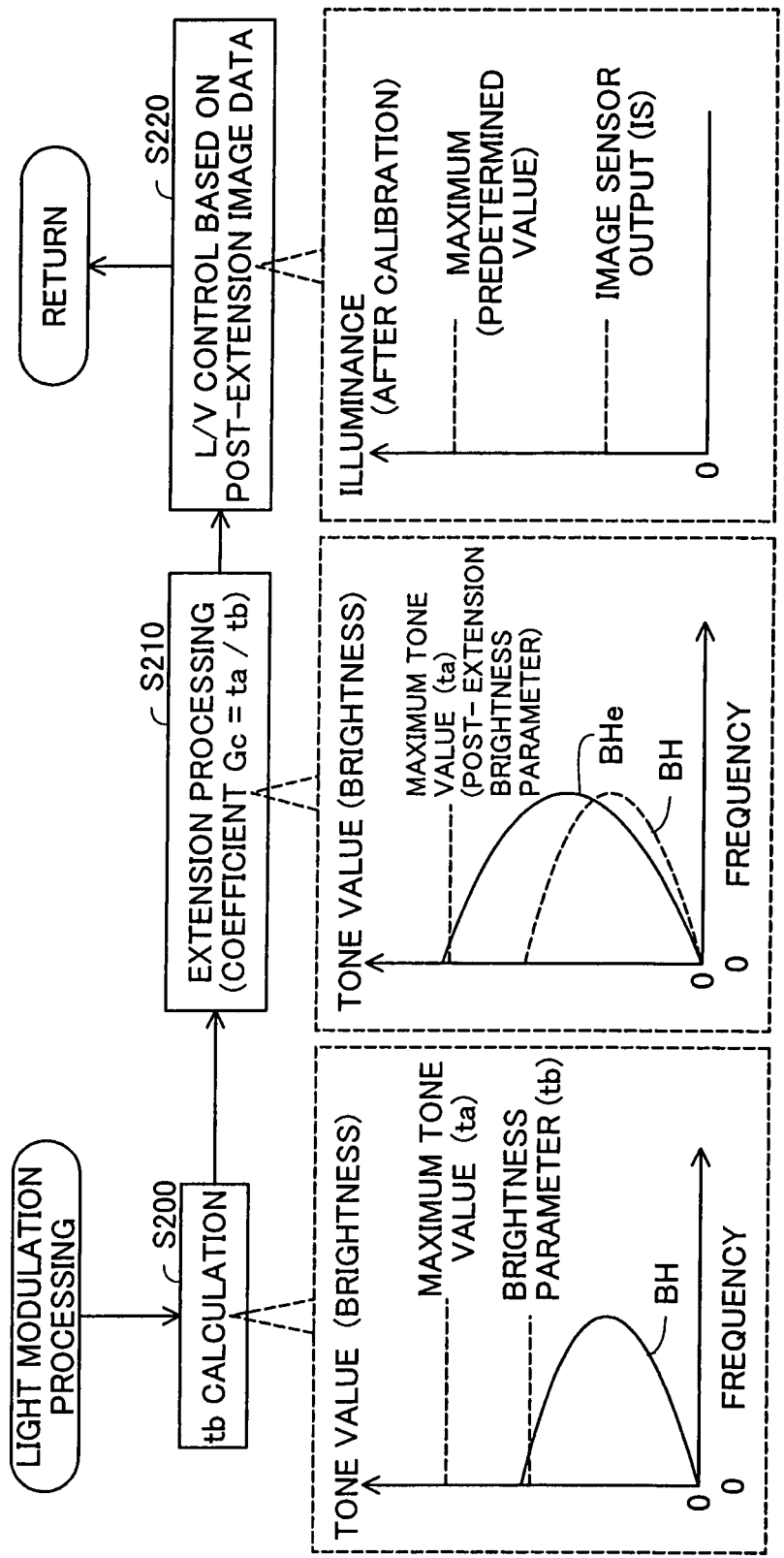
FIG. 6 is a schematic diagram showing light modulation processing.

FIG. 6 is a schematic diagram showing light modulation processing. In the first step S200, the image analyzer 531 (FIG. 3) calculates the brightness parameter tb by analyzing the image data received from the image A/D converter 510. The brightness parameter tb indicates the brightness of the part that is the brightest in the image. For example, that maximum brightness can be employed which comes from among the pixels remaining after excluding a predetermined number of the brightest pixels in the brightness histogram BH obtained by analyzing the image data. The brightest pixels are excluded in order to reduce the impact of noise included in the image signal. Various methods may be used to calculate the brightness parameter tb. For example, the entire image can be divided into multiple sections, and the highest average brightness from among the average brightness for the sections can be used as the brightness parameter tb.

In the next step S210, the data adjuster 533 (FIG. 3) executes extension processing. This extension processing is a routine in which the brightness of the image data is converted into a larger value in order to increase the transmittance of the liquid crystal light valves 240R, 240G, 240B. In this embodiment, the brightness of each pixel is multiplied by a value Gc. The value Gc is calculated by dividing the maximum value ta in the brightness range by the brightness parameter tb. As a result of this extension processing, the brightness distribution range of the image data is extended with a larger extension rate as the brightness parameter tb declines in brightness. In addition, as a result of this extension processing, the post-extension histogram BHe becomes distributed over the entire range from zero to the maximum value ta. The reason that the brightness (the transmittance of the liquid crystal light valves 240R, 240G, 240B) is increased is described below. The post-extension data is supplied to the D/A converter 540 as panel control data.

For the extension processing, various routines can be used in accordance with the image data format. For example, where the image data is represented using tone values for RGB color components, the RGB color component tone values may be multiplied by the coefficient Gc. Where the image data includes tone value for the brightness component, the brightness component tone value may be multiplied by the coefficient Gc.

In the next step S220, the D/A converter 540 (FIG. 3) converts the digital panel control data into analog control data. The panel driver 550 controls the three liquid crystal light valves 240R, 240G, 240B according to the analog control data to modulate the colored lights. As a result, the transmittance of each of the three liquid crystal light valves 240R, 240G, 240B is set to the transmittance corresponding to the image data whose brightness has been extended. However, as described below, because the brightness of the image projection light is restricted by the partial blocking mechanism 270 (FIG. 2), the brightness of the image projected onto the screen SC is maintained at a level that is appropriate for the original image signal. Incidentally, image sensor output IS is indicated in step S220 of FIG. 6. This image sensor output IS is sensor output data while the image is being displayed.

Figure 7:
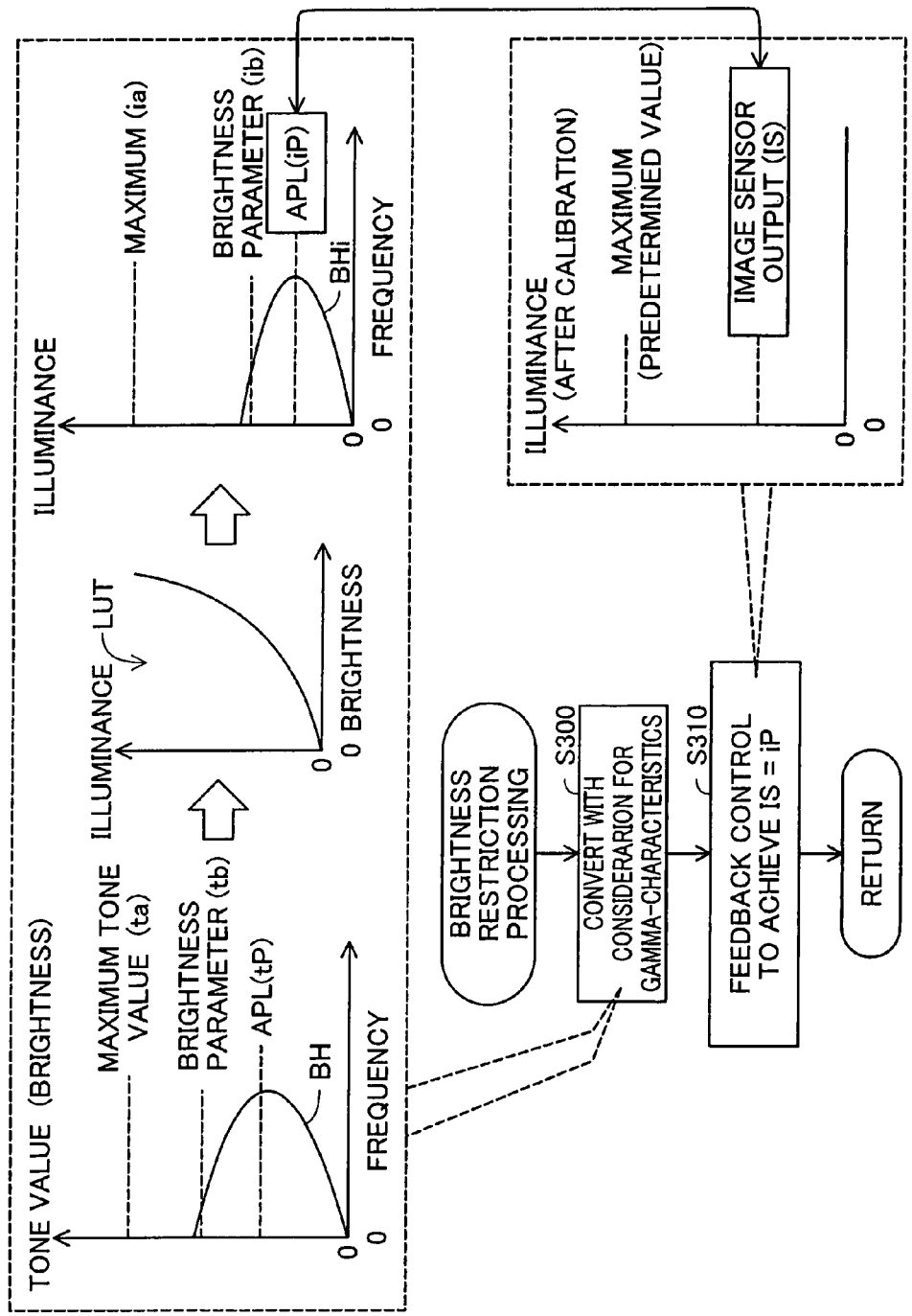
FIG. 7 is a schematic diagram showing brightness restriction processing.

FIG. 7 is a schematic diagram showing brightness restriction processing. In the first step S300, the image analyzer 531 (FIG. 3) calculates the target brightness value tP by analyzing the image data. The target brightness value tP represents the average brightness of the entire image. In this embodiment, the average brightness of the entire image is used as the target brightness value tP. In the description below, the average brightness of the entire image is also referred to as the APL (Average Picture Level).

The image analyzer 531 then converts the APL tP (target brightness value tP) represented as a brightness value into an APL iP (target brightness value iP) represented as an illuminance value. The correspondence relationship between brightness value and illuminance value is stored in advance in the memory (not shown) of the image analyzer 531 as a look-up table LUT. This look-up table LUT is set in advance via experimentation. For example, the correspondence relationship between the APL (brightness value) of the image and the sensor output data (illuminance value) can be measured with the aperture of the partial blocking mechanism 270 (FIGS. 2B, 2C) in the fully open state. When this is done, an image in which the brightness for all pixels is set to the same value can be used. The look-up table LUT obtained in this way shows the correspondence relationship that reflect the I/O characteristic (also referred to as the 'gamma characteristic') of the light valves 240R, 240G, 240B and the illuminance sensor 280.

The APL iP obtained through this conversion shows the illuminance that corresponds to the APL tP of the image data before brightness extension. In other words, the APL iP (illuminance) represents the appropriate value (the target value) for the image sensor output IS.

In the next step S310, the brightness restricting unit 532 (FIG. 3) outputs a drive instruction to the light amount adjuster 560 such that the image sensor output IS becomes equal to the APL iP. The image sensor output IS being larger than the APL iP means that the brightness of the image to be projected is excessively high. This in turn means that the size of the opening 279 of the partial blocking mechanism 279 is too large. In this case, the brightness restricting unit 532 outputs an instruction to reduce the size of the opening 279. Conversely, where the image sensor output IS is smaller than the APL iP, the brightness restricting unit 532 outputs an instruction to increase the size of the opening 279. The output of these drive instructions is continued until the difference between the image sensor output IS and the APL iP falls to or below a predetermined value. As a result of these instructions, the brightness is restricted by the partial blocking mechanism 270 such that the image sensor output IS is almost equal to the APL iP.

Through the brightness restriction processing described above, when a dark image (i.e., an image whose APL tP is small) is to be displayed, the upper limit of brightness of the image projection light (hereinafter also referred to as the 'light brightness upper limit') is set to a small value. The darker the image is (i.e., the smaller the APL tP is), the smaller the light brightness upper limit becomes. Furthermore, as described above, because the transmittance of the three liquid crystal light valves 240R, 240G, 240B is set to a transmittance corresponding to the image data whose brightness has been extended, the brightness of the image projected onto the screen SC is maintained at a level appropriate to the original image signal.

Figure 8:
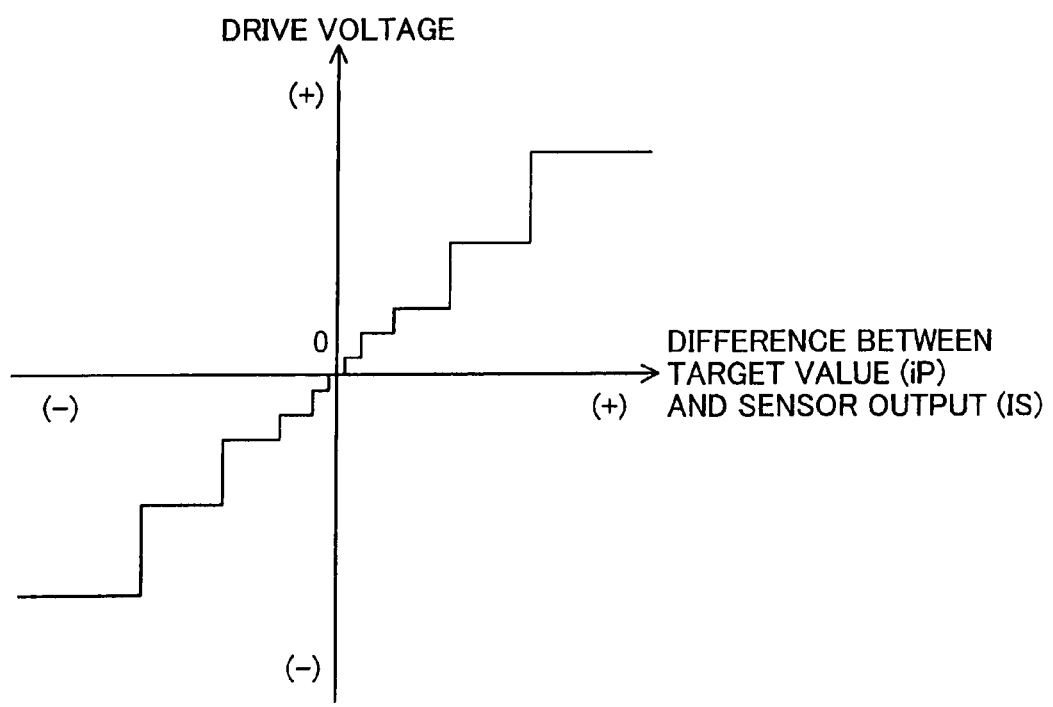
FIG. 8 is a graph showing the correspondence relationship between the drive voltage for wing drive units 276d, 278d and the control difference.

Using the partial blocking mechanism of this embodiment, the size of the area that is blocked by the blocking members (the wings 276w, 278w) in the cross-section of the light path changes as the blocking members move. As a result, where the speed of change of the size of the opening 279 (the size of the area blocked by the blocking members) is excessively high, it becomes increasingly likely that the size of the opening 279 will change to beyond the preferred size (overshoot) due to the momentum of the blocking members. Therefore, in order to ensure that the image sensor output IS appropriately approaches the APL iP, it is preferred that as the difference between the image sensor output IS and the APL iP becomes smaller, the speed of change of the size of the opening 279 decreases. FIG. 8 is a graph showing the correspondence relationship between the drive voltage for the wing drive units 276d, 278d and a control difference. The horizontal axis represents the control difference and the vertical axis represents the drive voltage. The control difference is the difference obtained by subtracting the image sensor output IS from the APL iP. Where the drive voltage is positive, the size of the opening 279 increases, and where the drive voltage is negative, the size of the opening 279 declines. In the graph shown in FIG. 8, the drive voltage is set such that it approaches zero as the control difference approaches zero. As a result, control is executed to prevent the image sensor output IS from advancing past the APL iP to ensure that the image sensor output IS can appropriately approach the APL iP. The brightness restricting unit 532 specifies the drive voltage in accordance with the graph shown in FIG. 8. The light amount adjuster 560 applies the specified drive voltage to the wing drive units 276d, 278d. Where the likelihood that the size of the opening 279 will change beyond the desired size is small, the speed of change of the size of the opening 279 may be made constant regardless of the control difference.

As described above, in the first embodiment, when a dark image is displayed, the light amount (the light brightness upper limit) is reduced by the partial blocking mechanism 270. As a result, dark images can be displayed darker in comparison with the case where a dark image is displayed using only the liquid crystal light valves 240R, 240G, 240B that perform light modulation. As a result, the contrast ratio between when a bright image is displayed and when a dark image is displayed can be increased (i.e., the dynamic range can be increased), even if light leaks from the liquid crystal light valves 240R, 240G, 240B. Furthermore, because the brightness of the image data is extended such that the restricted light amount can be compensated for, the brightness of the displayed image can be maintained at an appropriate level.

Furthermore, in the first embodiment, the light brightness upper limit is controlled via feedback control based on the image sensor output IS. This image sensor output IS represents the detection result of the brightness (illuminance) of the image projection light adjusted by the light amount adjuster 560 (i.e., the partial blocking mechanism 270). As a result, the light brightness upper limit can be appropriately adjusted in accordance with the image to be displayed. For example, with an image whose average brightness is dark, the APL tP becomes small, and therefore it can be displayed to be darker. Consequently, the dynamic range can be appropriately enlarged in accordance with the image. In addition, the light brightness upper limit is appropriately controlled even if the brightness of the image projection light when the same control is carried out is not constant due to individual differences and/or changes over time in the liquid crystal projector 100 (especially the light source, liquid crystal panels and partial blocking mechanism). As a result, the brightness of the actual image projection light can be prevented from deviating from the appropriate level.

Moreover, in the first embodiment, as shown in FIG. 2D, the illuminance sensor 280 receives the reflected light RL from the back lens 260*ib*, which is the optical element immediately behind the convergence point 260*i*. Because this reflected light RL is reflected light in the vicinity of the convergence point 260*i*, the entire image to be displayed is concentrated in the small cross-section of the reflected light RL. Therefore, the illuminance sensor 280 can receive the light from the entire image even if the sensor 280 does not include an excessively large light receiving surface, and consequently, the sensor 280 can easily detect the illuminance of the light for the entire image. As a result, sensor output data appropriate for the comparison with the APL iP that indicates the image brightness can be easily obtained.

In addition, in the first embodiment, as shown in FIG. 2A, the partial blocking mechanism 270 is disposed near the convergence point 260*i*. Therefore, the opening 279 of the partial blocking mechanism 270 can be made small in size. Consequently, the partial blocking mechanism 270 can be made small in size and the operation speed of the partial blocking mechanism 270 can be increased. Even where the image data switching speed is fast, as in the case where a moving image is displayed, the increased operation speed enables the partial blocking mechanism 270 to keep up with changes in the image data. Incidentally, it is preferred that the partial blocking mechanism be disposed near the convergence point 260*i*, and it is more preferred that the partial blocking mechanism be disposed between the optical element immediately in front of the convergence point and the optical element immediately behind the convergence point. As the optical elements, not only lenses but also any of various other types of optical elements, such as filters and mirrors, may be used.

B. Second Embodiment

Figure 9:
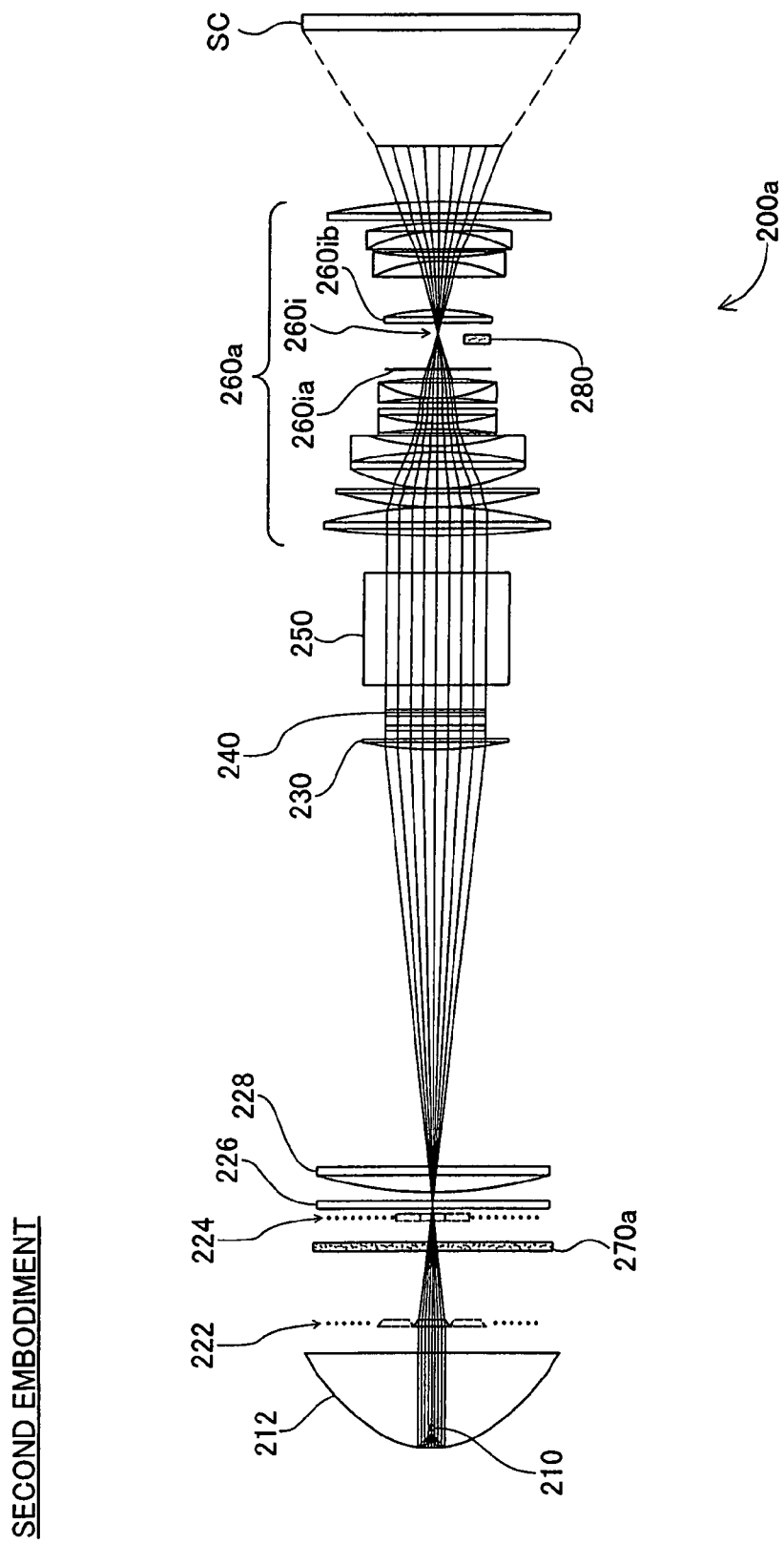
FIG. 9 is an explanatory drawing showing optical system 200a of the second embodiment.

FIG. 9 is an explanatory drawing showing the optical system 200*a* of a second embodiment. The optical system 200*a* can be used in place of the optical system 200 of the first embodiment shown in FIG. 2A. The only difference from the optical system 200 of the first embodiment is that the partial blocking mechanism 270*a* is disposed between the first lens array 222 and the second lens array 224 instead of between the front lens 250*ia* and the back lens 260*ib*. The configuration of this partial blocking mechanism 270*a* is the same as that of the partial blocking mechanism 270 shown in FIG. 2B, except that the size of the opening is larger. Here, the amount of light that enters the second lens array 224 is adjusted by adjusting the size of the opening of the partial blocking mechanism 270*a*. As a result, in the same manner as when the partial blocking mechanism 270 of FIG. 2B is used, the light brightness upper limit is adjusted by the partial blocking mechanism 270*a*. When using this optical system 200*a*, the controller 500 (FIG. 3) can execute calibration processing (FIG. 4) and image display processing (FIG. 5) as with the first embodiment described above.

As the position of the partial blocking mechanism, any position on the light path extending from the light source lamp 210 to the image projection surface (screen SC) may be employed at which the light brightness upper limit can be adjusted. Furthermore, as the position of the partial blocking mechanism, it is preferred to employ a position at which light that reaches a certain part of the displayed image is dispersed over a large area in the light beam cross-section (for example, a position in the integrator shown in FIG. 9 or a position in the projection lens system 260 shown in FIG. 2A), such that the brightness of only a part of the image is not reduced by the partial blocking mechanism.

C. Third Embodiment

C1. Configuration of the Apparatus

Figure 10:
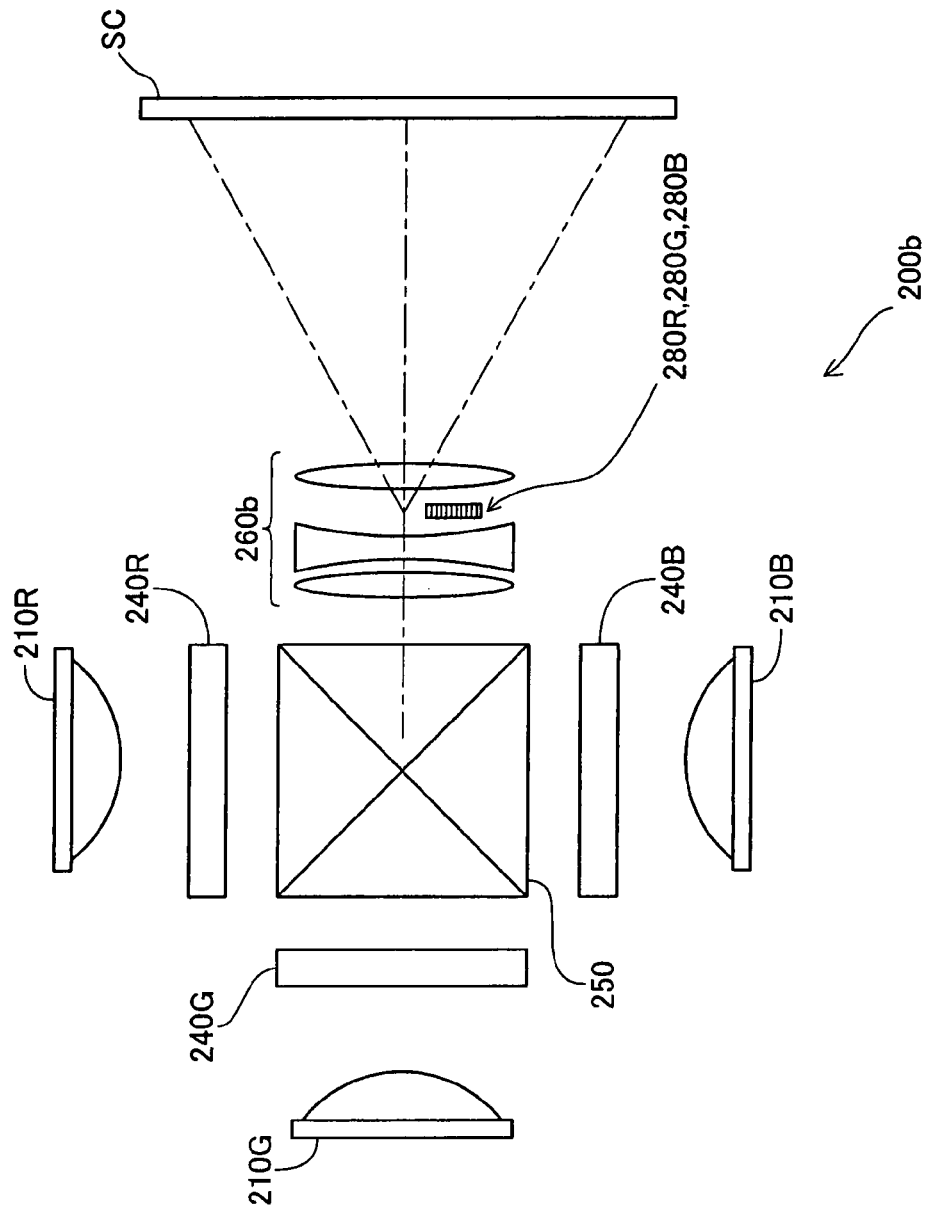
FIG. 10 is a drawing showing the configuration of optical system 200b of the third embodiment.

FIG. 10 shows the configuration of the optical system 200*b* of the third embodiment. It differs from the optical system 200 of the first embodiment shown in FIG. 2A in three principal ways. First of all, the optical system 200*b* includes three light-emitting diode (LED) light sources 210R, 210G, 210B that respectively emit light of the three RGB colors in place of the single light source lamp 210 used in common for the RGB color components. Secondly, it includes three optical sensors 280R, 270G, 280B that respectively detect the intensity of the three colored lights in place of the single illuminance sensor 280. Thirdly, the partial blocking mechanism 270 is omitted. The configuration of the projection lens system 260*b* is the same as that of the projection lens system 260 shown in FIG. 2 except that the partial blocking mechanism 270 is omitted and three optical sensors 280R, 280G, 280B are used in place of the illuminance sensor 280. The light sources that emit RGB colored lights are not limited to LEDs, any various types of light sources (such as laser diodes) can be used. Light sources that combine a light-emitting body and a color filter may be used as well.

The three colored lights emitted from the three LED light sources 210R, 210G, 210B respectively enter the three liquid crystal light valves 240R, 240G, 240B. The three liquid crystal light valves 240R, 240G, 240B respectively modulate the three colored lights. The three image projection light color components exiting the three liquid crystal light valves 240R, 240G, 240B are synthesized by the prism 250, and the synthesized image projection light enters the projection lens system 260*b*. The projection lens system 260*b* projects the image in the same manner as the projection lens system 260 shown in FIG. 2.

Figure 11:
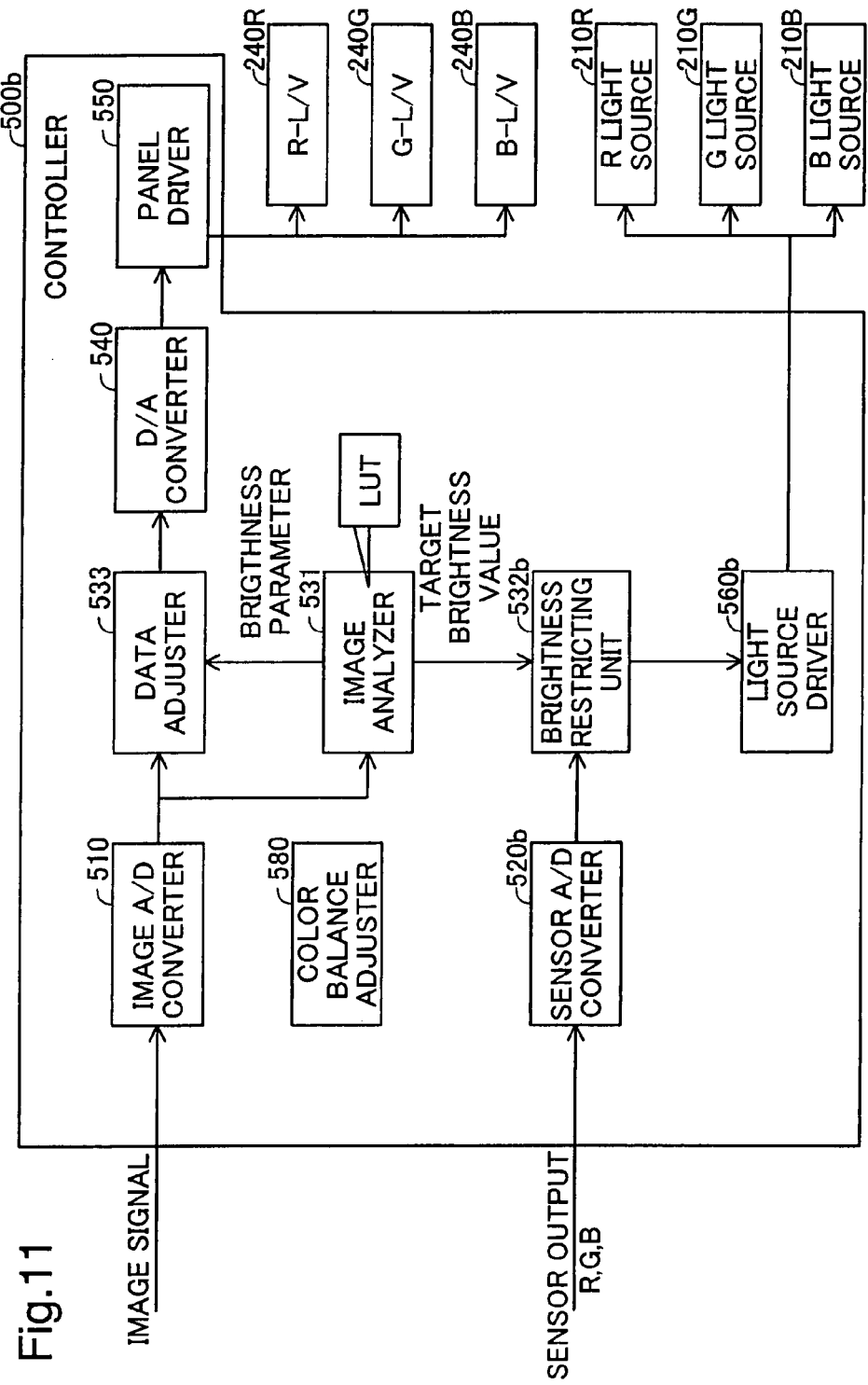
FIG. 11 is a drawing showing the internal configuration of controller 500b of the third embodiment.

FIG. 11 is a drawing showing the internal configuration of the controller 500b of the third embodiment. It differs from the controller 500 shown in FIG. 3 in two ways. The first difference is that the sensor A/D converter 520b, the brightness restricting unit 532b, and the light source driver 560b adjust the light brightness upper limit by controlling the amounts of lights emitted by the three LED light sources 210R, 210G, 210B. The second difference is that a color balance adjuster 580 is added. The other component elements of the controller 500b are the same as those in the controller 500 shown in FIG. 3. Each component element of the controller 500b includes electronic circuitry. Furthermore, the component elements of the controller 500b are interconnected by a bus not shown.

The sensor A/D converter 520b converts the analog output signals from the three light sensors 280R, 280G, 280B into digital sensor output data. The brightness restricting unit 532b determines specified light amount values according to the sensor output data from the three light sensors and the target brightness value received from the image analyzer 531. The light source driver 560b supplies drive signals to the three LED light sources 210R, 210G, 210B according to the specified light amount values. The light amount from each of the three LED light sources 210R, 210G, 210B is adjusted via PWM (Pulse Width Modulation) control that modulates the pulse width of the drive signals supplied to the LED sources. Incidentally, the light source driver 560b corresponds to the 'light amount adjuster' in the claims.

Even when the same control is carried out according to the same specified light amount value, the actual amount of light (brightness) emitted from the LED light source may not be the same due to individual differences and/or changes over time in the LED light source. In order to display the image using the preferred colors in a situation like this, the color balance adjuster 580 adjusts the color balance in the manner described below.

C2. Initialization Processing

Figure 12:
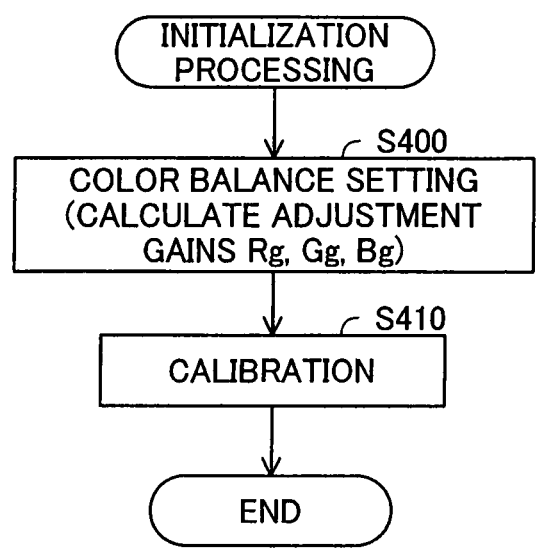
FIG. 12 is an explanatory drawing showing the sequence of operations of initialization processing.

FIG. 12 is an explanatory drawing showing the sequence of operations of initialization processing. In the first step S400, color balance setting is performed. This color balance setting is processing for calculating coefficients to balance the light amounts from the three LED light sources 210R, 210G, 210B.

First, the color balance adjuster 580 (FIG. 11) instructs the three liquid crystal light valves 240R, 240G, 240B to display the all-white image. When this is done, the color balance adjuster 580 outputs an instruction to the light source driver 560b to turn ON the three LED light sources 210R, 210G, 210B at their respective maximum light amounts (Namely, the specified light amount value for each of the three light sources is set to the predetermined maximum value). The light source driver 560b turns ON the three LED light sources 210R, 210G, 210B using the maximum light amounts respectively according to the instruction. As a result, the light amounts that enter the three light sensors 280R, 280G, 280B, respectively, become the maximum. The color balance adjuster 580 then obtains sensor output data Ri, Gi, Bi for the RGB colors from the sensor A/D converter 520b. The data Ri, Gi, Bi obtained here are data that are obtained via A/D conversion using preset conditions. In other words, the data Ri, Gi, Bi have not undergone correction.

In this embodiment, the output data ratio among the three light sensors 280R, 280G, 280B (Ri:Gi:Bi) is the same as the actual light amount ratio among the three LED light sources 210R, 210G, 210B at the time of color balance setting. Therefore, the color balance adjuster 580 calculates the adjustment gains Rg, Gg, Bg for the RGB colors in accordance with the expressions shown below using a predetermined target RGB ratio (Ro:Go:Bo).

$$Rg=Ro/Ri \tag{1R}$$

$$Gg=Go/Gi \tag{1G}$$

$$Bg=Bo/Bi \tag{1B}$$

The target RGB ratio (Ro:Go:Bo) is a light amount ratio for the three LED light sources 210R, 210G, 210B that can display the image using preferred colors. This ratio is preset according to experimentation. For example, it may be set such that a white image can be displayed using a desired white color. As described below, when displaying an image, the specified light amount value ratio among the three LED light sources 210R, 210G, 210B is adjusted such that it is the same as the ratio among the adjustment gains Rg, Gg, Bg therefor. Consequently, images can be displayed using preferred colors.

In the next step S410, calibration is carried out. This calibration processing is the same as the calibration processing described with reference to FIG. 4. However, the sensor output data used in the third embodiment are not illuminance value data but rather the intensity data of each of the RGB colored lights. The brightness restricting unit 532b calculates the illuminance value from the RGB intensities, and using the calculated illuminance value, performs calibration in the same manner as in the example shown in FIG. 4.

The calculation of illuminance value from the RGB sensor output data is performed in accordance with preset correspondence relationship. The correspondence relationship between RGB and illuminance value can be set according to experimentation. In the calibration processing of the third embodiment, the color balance adjuster 580 corrects each specified light amount value such that the specified light amount ratio among the three LED light sources 210R, 210G, 210B becomes the same as the adjustment gain ratio (Rg:Gg:Bg) described above. This correction is the same as the correction executed when the image is displayed (described in detail below).

The brightness restricting unit 532b normalizes the sensor output data for the three colors such that the calculated illuminance values become the predetermined maximum values. As a result, the illuminance value range after the calibration extends from zero to the maximum value. The normalization of the sensor output data for the three colors can be performed via various methods, as in the case of the first embodiment.

Initialization is completed as described above. The timing at which the initialization processing is executed can be any of various times, as in the case of the calibration processing executed in the first embodiment.

C3. Light Modulation Processing and Brightness Restriction Processing in Third Embodiment In the third embodiment, as in the case of the first embodiment shown in FIG. 5, image display processing is executed. The light modulation processing in step S100 is the same as the light modulation processing of the first embodiment shown in FIG. 6. For the brightness restriction processing of step S110, modified version of the brightness restriction processing of the first embodiment shown in FIG. 7 is used.

The first step S300 in FIG. 7 is the same as step S300 of the first embodiment. In the next step S310, the brightness restricting unit 532b adjusts the light amounts from the three LED light sources 210R, 210G, 210B in accordance with the target brightness value iP. Specifically, the brightness restricting unit 532b (FIG. 11) first calculates the illuminance value from the sensor output data from the three light sensors 280R, 280G, 280B. The correspondence relationship between RGB and the illuminance value is the same as those explained with regard to calibration described above (S410 in FIG. 12).

The illuminance value thus calculated is used as the image sensor output IS in the third embodiment. The brightness restricting unit 532b adjusts the specified light amount value for each of the three LED light sources 210R, 210G, 210B such that the image sensor output IS becomes equal to the APL iP. Where the image sensor output IS is larger than the APL iP, the brightness restricting unit 532b reduces the specified light amount values for the LED light sources 210R, 210G, 210B. Conversely, where the image sensor output IS is smaller than the APL iP, the brightness restricting unit 532b increases the specified light amount values. Adjustment of the specified light amount values is continued until the difference between the image sensor output IS and the APL iP falls to or below a predetermined value. As a result, the light amounts from the three LED light sources 210R, 210G, 210B are adjusted such that the image sensor output IS is almost equal to the APL iP.

The color balance adjuster 580 also corrects each specified light amount value such that the specified light amount value ratio among the three LED light sources 210R, 210G, 210B becomes the same as the adjustment gain ratio (Rg, Gg, Bg). Consequently, the ratio of the actual amounts of light emitted from the three LED light sources 210R, 210G, 210B becomes the same as the target RGB ratio (Ro:Go:Bo). As a result, the image is displayed using preferred colors.

When adjusting the specified light amount value ratio, it is preferred that the specified light amount value not be changed with regard to the color component having the largest adjustment gain and that the specified light amount values for the remaining color components be reduced. By adjusting the specified light amount value ratio without increasing any specified light amount value as described above, a situation in which the specified light amount value for one of the light sources increases in excess of the maximum value can be prevented. In addition, by not reducing the specified light amount value for the color component having the largest adjustment gain as described above, the maximum brightness of the displayed image can be prevented from becoming excessively small in comparison with the maximum light amounts that can be emitted from the LED light sources 210R, 210G, 210B.

When a dark image (an image having a small APL tP) is displayed via the brightness restriction processing described above, the light amounts from the three LED light sources 210R, 210G, 210B or the light brightness upper limits are set to a small value. As the image becomes darker (i.e., as the APL tP becomes smaller), the light brightness upper limits become smaller. As a result, in the third embodiment, as in the first embodiment, the contrast ratio can be increased. In addition, because the light amount emitted from each of the LED light sources 210R, 210G, 210B is reduced when displaying a dark image, power consumption can also be reduced.

Furthermore, in the third embodiment, the light brightness upper limit is controlled via feedback control based on the brightness of the image projection light (illuminance) following adjustment by the light amount adjuster (light source driver 560b). As a result, as in the case of the first embodiment, the light brightness upper limit can be appropriately adjusted in accordance with the image to be displayed. Moreover, the actual brightness of the image projection light can be prevented from deviating from an appropriate level due to the influence from individual differences and/or changes over time in the liquid crystal projector.

In addition, in the third embodiment, the light amount ratio of the three light sources 210R, 210G, 210B (the image projection light color balance) is adjusted to a desirable ratio according to the detection results from the three light sensors 280R, 280G, 280B. As a result, individual differences and/or changes over time in the three light sources 210R, 210G, 210B can be compensated for, and the image can be displayed using preferred colors.

In the third embodiment, the three light sensors 280R, 280G, 280B are used for both light brightness upper limit adjustment and color balance adjustment. As a result, in comparison with the situation where separate light sensors are used for light brightness upper limit adjustment and color balance adjustment, the cost of manufacturing can be reduced.

D. Fourth Embodiment

Figure 13:
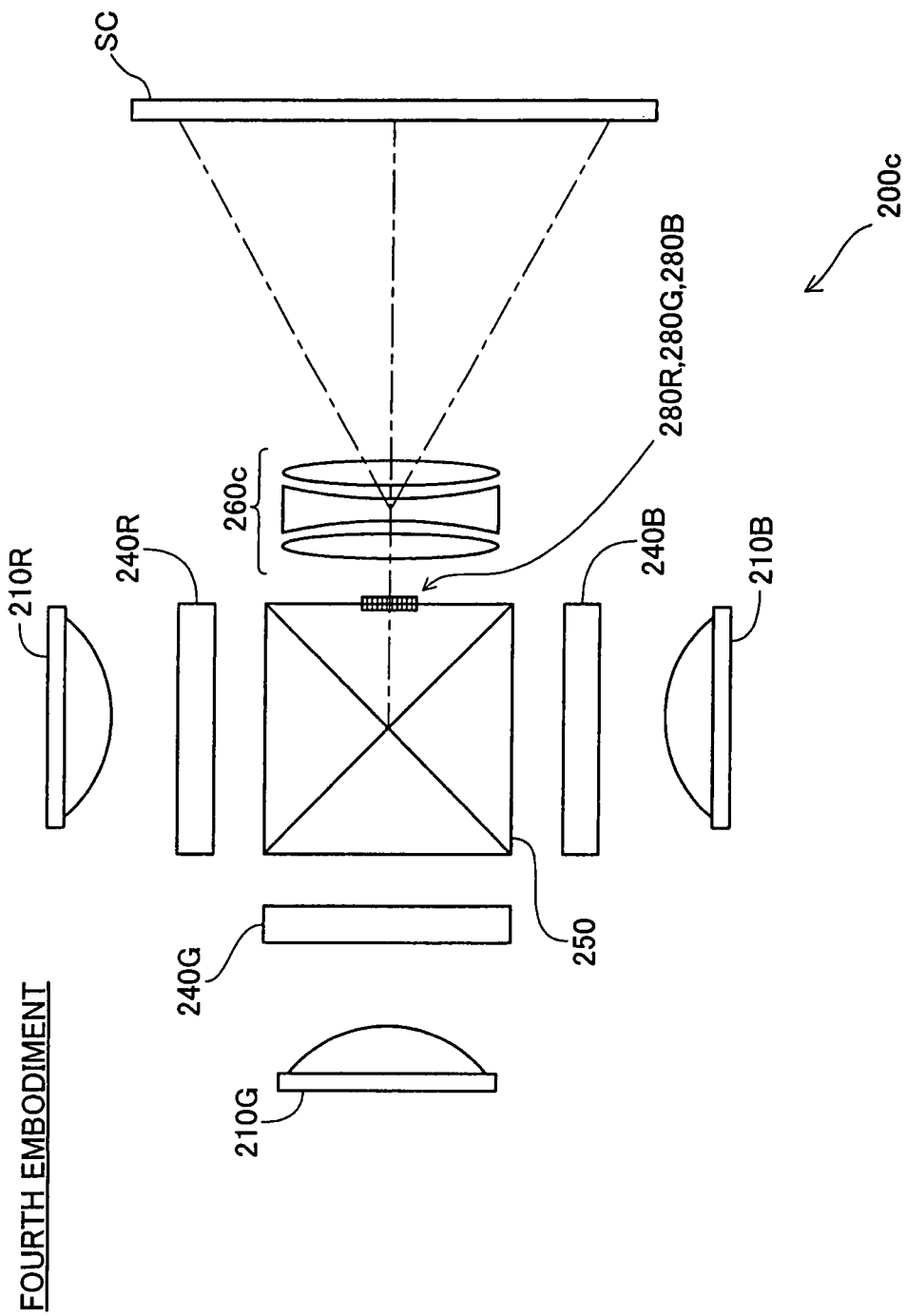
FIG. 13 is a drawing showing the configuration of an optical system 200c of the fourth embodiment.

FIG. 13 is a drawing showing the configuration of the optical system 200c of a fourth embodiment. This optical system 200c can be used in the third embodiment described above in place of the optical system 200b shown in FIG. 10. The different from the optical system 200b of the third embodiment is that the three light sensors 280R, 280G, 280B are disposed not in the projection lens system 260c but away from the light path of the image projection light between the projection lens system 260c and the prism 250.

The three light sensors 280R, 280G, 280B are disposed such that they receive reflected light (not shown) from the frontmost lens of the projection lens system 260c. Here, the three light sensors 280R, 280G, 280B receive synthesized image projection light. As a result, as in the case of the third embodiment shown in FIG. 10, illuminance appropriate for comparison with the APL iP can be calculated from the detection results from each light sensor 280R, 280G, 280B. When using this optical system 200c as well, the controller 500b (FIG. 11) can execute initialization processing (FIG. 12) and image display processing in the same manner as in the third embodiment described above.

E. Fifth Embodiment

Figure 14:
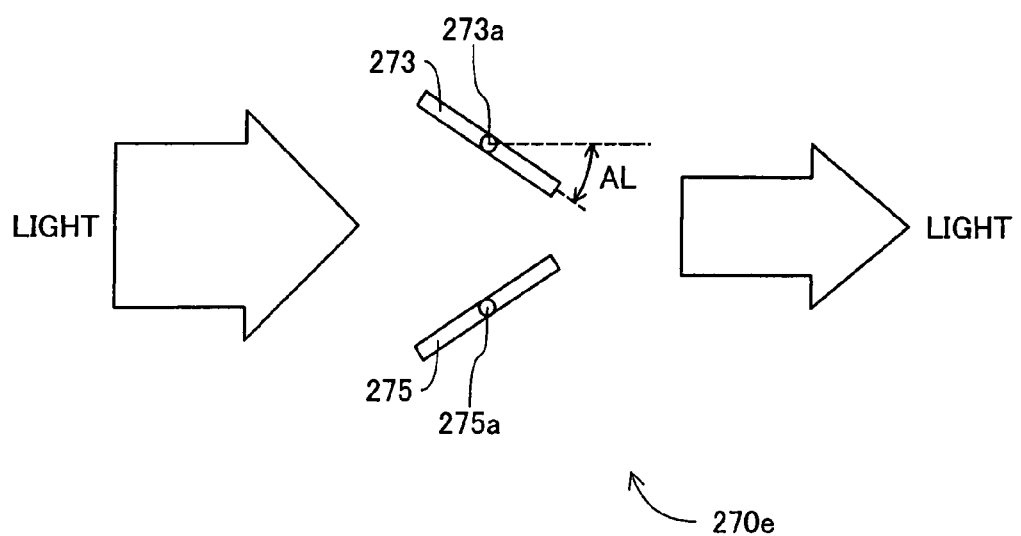
FIG. 14 is a cross-sectional view of partial blocking mechanism 270e.

In the embodiments described above, the partial blocking mechanism is not limited to a mechanism in which two wings 276w, 278w (blocking members) as shown in FIG. 2B are moved, and any partial blocking mechanism may be employed which has a member or members that block a part of the cross-section of the light path and can change the size of the area blocked by the blocking member(s) via the movement thereof. As such a partial blocking mechanism, an aperture mechanism in which the size of the opening is adjusted by the movement of three or more wings may be used, for example. A partial blocking mechanism also may be employed that uses blocking members that open and close while moving around a rotational shaft in an arc in the same manner as a hinged door. FIG. 14 is a cross-sectional view of such a partial blocking mechanism 270e. This partial blocking mechanism 270e has two doors 273, 275. Each of these doors 273, 275 has a flat plate configuration and can respectively rotate around rotational shafts 273a, 275a that extend perpendicular to the light path. As the angle AL between each door 273, 275 and the light path approaches a right angle (90-degree), the size of the area blocked by the blocking members (doors 273, 275) increases.

Using the partial blocking mechanism described above, the size of the area blocked by the blocking members can be easily reduced. For example, if the blocking members are moved outside the light path, the light damping rate can be reduced to almost zero. As a result, the light brightness upper limit can be adjusted without reducing the projectable brightness maximum value.

F. Variations

Of the component elements in the embodiments described above, component elements other than those claimed in the independent claim are additional elements and may be omitted. In addition, the invention is not limited to the examples and embodiments described above, but may be implemented in various other forms within its scope. It can be implemented according to the following variations, for example.

Variation 1

In the embodiments described above, it is acceptable if the image analyzer does not determine the target brightness value such that the target brightness value declines as the brightness of the image represented by the image data declines. Generally, for the target brightness value, any value that is determined according to the result of analysis of the image data can be used. Here, the target value may be determined regardless of the image brightness represented by the image data. For example, the target value may be determined in accordance with the type of object (a person or a mountain, for example) detected from the image represented by the image data.

In the embodiments described above, it is acceptable if the data adjuster does not execute extension processing. Generally, for the processing executed by the data adjuster, any processing that generates, according to the image data, control data used for the control of the spatial light modulator can be employed. For example, processing that generates control data without modifying the image data brightness distribution range may be used. Furthermore, processing that reduce the brightness distribution range for the image data may be used. Using this processing, images suitable for users who prefer images having small brightness differences within the displayed image can be displayed.

Furthermore, it is preferred that the image analyzer determines the target brightness value such that the target brightness value declines as the brightness of the image represented by the image data declines, and the data adjuster executes the extension processing. In this way, the brightness of the image actually displayed can be maintained at an appropriate level, and dark images are prevented from being displayed using a light amount that entails excessive brightness.

For the brightness of the image represented by the image data, not only the average brightness for the entire image, but also any of various other values correlated to the image brightness can be used. For example, a weighted average brightness obtained by applying weights whose magnitude differs depending on the position in the image may be used. The median value in the brightness histogram may be used. Alternatively, instead of using one of these values as the target brightness value, a value that is calculated from any of these values in accordance with a predetermined function may be used as the target brightness value. The average brightness value that expresses the average brightness of the entire image is a representative value for the entire image, whether it is weighted or not. Therefore, if the target brightness value is determined according to the average brightness, an appropriate target value can be obtained for various images.

Variation 2

In the embodiments described above, as the extension processing, any processing that extends the image data brightness range may be employed. In other words, any processing that converts the brightness into higher values may be employed. For example, the image data brightness distribution range can be extended such that the degree of extension increases as the brightness of the image represented by the image data (for example, the average brightness or the brightness median value) declines. In any case, the brightness distribution after the extension processing need not cover the entire range from zero to the maximum value. In addition, it is preferred that the extension processing be carried out such that the brightness parameter tb does not exceed the maximum brightness value. In this way, expansion of excessively bright areas where brightness is at the maximum value can be prevented.

Variation 3

In the embodiments described above, each light sensor may be disposed at a position that is away from the light path of the image projection light extending to the projection surface (screen SC) but at which the sensor can receive the image projection light. This holds true regardless whether or not a partial blocking mechanism is used. When a partial blocking mechanism is used, the light sensors can be disposed at positions at which they receive the image projection light after it passes through the partial blocking mechanism. In any case, it is preferred that the light sensors receive image projection light near the convergence point. For example, in the optical system 200a shown in FIG. 9, it is preferred that the reflected light from the optical element (front lens 260ia) immediately in front of the convergence point 260i be received. It is also preferred that the reflected light from the optical element (back lens 260ib) immediately behind the convergence point 260i be received. It is also preferred that the both of reflected lights from these two optical elements be received. In these ways, because the light sensors can easily receive the light from the entire image, detection results indicating the image brightness can be easily obtained. It is also acceptable if the light sensors are disposed in the light path for the image projection light. However, in such a case, the brightness of the projection light is reduced.

Variation 4

In the embodiments described above, the correspondence relationship between brightness value and illuminance value can be set using some method other than using a look-up table LUT. For example, the correspondence relationship can be defined based on a function by which the illuminance value is obtained from the brightness. In addition, as the method to determine the correspondence relationship between brightness value and illuminance value, not only the methods described above but also any other method may be used. For example, the following method can be used. First, the desirable brightness for the projected image for various APLs tP is determined via sensory evaluation. When this is done, in order to adjust the brightness, the transmittance of the light valves 240R, 240G, 240B may be adjusted (FIG. 3), the size of the opening 279 of the partial blocking mechanism 270 may be adjusted (FIG. 2B) and/or the light amount from each LED light source 210R, 210G, 210B may be adjusted (FIG. 10). Subsequently, sensor output data is obtained while an image having the desirable brightness is being projected. Based on the experimental results thus obtained, the correspondence relationship between the APL tP (brightness value) and the sensor output data (illuminance values) can be determined.

Variation 5

When multiple light sources for multiple colored lights having different hues (three light sources of the colors RGB, for example) are used, as in the case of the third and fourth embodiments described above, the light brightness upper limit may be adjusted using a partial blocking mechanism as in the case of the first and second embodiments. Furthermore, when a single light source common to all color components is used, as in the case of the first and second embodiments, the light brightness upper limit may be adjusted by adjusting the amount of light emitted by the light source, as in the case of the third and fourth embodiments.

Variation 6

In the embodiments described above, the processing to adjust the color balance of the image projection light is not limited to processing that corrects the specified light amount value, and any of various other types of processing may be employed. For example, the RGB intensity ratio in the image data may be corrected according to the adjustment gains Rg, Gg, Bg.

The color sensors used for color balance adjustment are not limited to the three-color or RGB sensors. Multiple color sensors that detect the intensity of each of multiple colored lights having different hues may be used instead. For example, three sensors that respectively detect the intensity of cyan (C), magenta (M) and yellow (Y) may be used. It is also acceptable if four or more sensors that respectively detect the intensity of colored lights having different hues are used. In any case, the color balance adjuster may adjust the intensity ratio among the color components (RGB, for example) in the image projection light according to the detection results from the multiple color sensors. In the same way, the brightness restricting unit may calculate the brightness of the image projection light according to a predetermined correspondence relationship using the detection results from the multiple color sensors.

Variation 7

In the embodiments described above, the spatial light modulator is not limited to a liquid crystal light valve, and any of various other devices may be employed that modulates the light emitted from the light source into image projection light used to project the light. For example, a DMD (Digital Micromirror Device, trademark of Texas Instruments) may be used.

Variation 8

In the embodiments described above, it is preferred that the amount of change in the target brightness value per unit of time be limited to below a predetermined value. In this way, even if the brightness of the image changes considerably responsive to switching of the image data, as in the case where a moving image having considerable brightness variations is displayed, the target brightness value is prevented from changing suddenly. As a result, a sudden change in the brightness of the image being displayed can be prevented. This holds true for the amount of change in the brightness parameter per unit of time as well.

Variation 9

In the embodiments described above, the method to adjust the upper limit of the brightness of the image projection light (the light brightness upper limit) is not limited to a method by which the brightness of the light source (the amount of light emission) is adjusted, or a method by which the partial blocking mechanism is controlled. Any of various other methods may be employed. For example, the brightness upper limit may be adjusted using a device that changes the light transmittance by rotating the transmittance axis of the polarizing plate. It is preferred, however, that the light amount adjuster controls at least one of the brightness of the light source (the amount of light emission) and the partial blocking mechanism in order to adjust the brightness upper limit. In this way, the light brightness upper limit can be adjusted without reducing the projectable maximum brightness.

Variation 10

In the embodiments described above, it is acceptable if part of the configuration realized via hardware is replaced by software, and conversely, if part of the configuration realized via software is replaced by hardware. For example, the data adjuster 533 shown in FIG. 3 may be replaced by a computer that includes a CPU and a memory. In this case, the CPU realizes the various functions of the data adjuster 533 by executing programs.

In addition, where part or all of the functions of the invention are realized via software, such software (a computer program) may be provided in the form of a program stored on a computer-readable recording medium. A 'computer-readable recording medium' in the invention includes not only portable recording media such as flexible disks and CD-ROMs but also internal computer storage devices such as various types of RAMs and ROMs and external storage devices connected to a computer such as hard disks.

Although the invention has been described and illustrated in detail, it is clearly understood that the same is by way of illustration and example only and is not to be taken by way of limitation, the spirit and scope of the invention being limited only by the terms of the appended claims.

What is claimed is:

1. A projection display apparatus that displays an image according to image data, comprising:
   a light source;
   a spatial light modulator configured to modulate, according to given control data, light emitted from the light source into image projection light to project an image;
   a data adjuster configured to generate the control data according to the image data;
   a light amount adjuster configured to adjust an upper limit of brightness of the image projection light;
   a light sensor configured to detect brightness of the image projection light adjusted by the light amount adjuster;
   an image analyzer configured to analyze the image data and to determine, according to analysis result of the image data, a target value for the brightness detected by the light sensor, the image analyzer repeatedly determining the target value each time the image data changes;
   a brightness restricting unit configured to control the light amount adjuster to cause the brightness detected by the light sensor to approach the target value; and a projection lens system configured to project the image projection light, wherein
the projection lens system includes a first optical element and a second optical element disposed at a projected image side of the first optical element,
the projection lens system has a convergence point at which the image projection light converges between the first and the second optical elements, and
the light sensor receives light from at least one of the first and the second optical elements.

2. The projection display apparatus according to claim 1, wherein
the data adjuster generates the control data by extending brightness distribution range of the image data, and
the image analyzer determines the target value of the brightness such that the target value of the brightness becomes darker as brightness of an image represented by the image data becomes darker.

3. The projection display apparatus according to claim 2, wherein
the data adjuster extends the brightness distribution range of the image data according to a brightness parameter that indicates brightness of the brightest part of the image data such that the brightness distribution range of the image data is extended with a larger extension rate as the brightness parameter indicates a darker value of brightness.

4. The projection display apparatus according to claim 1, further comprising:
an optical element disposed in a light path of the image projection light, wherein
the light sensor is disposed away from the light path of the image projection light and receives light from the optical element.

5. The projection display apparatus according to claim 1, wherein
the light amount adjuster adjusts brightness of the light source in order to adjust the upper limit of brightness.

6. The projection display apparatus according to claim 1, further comprising:
a partial blocking mechanism disposed on a light path extending from the light source to an image projection surface, the partial blocking mechanism including a blocking member that blocks a part of cross-section of the light path, the blocking member being configured to move to change size of the part blocked by the blocking member, wherein
the light amount adjuster adjusts the size of the blocked part by driving the partial blocking mechanism in order to adjust the upper limit of brightness.

7. The projection display apparatus according to claim 6, wherein
the brightness restricting unit controls the light amount adjuster such that speed of change of the size of the blocked part decreases as a difference between the target value and the brightness detected by the light sensor decreases.

8. The projection display apparatus according to claim 6, further comprising:
a projection lens system configured to project the image projection light, wherein
the projection lens system includes a first optical element and a second optical element disposed at a projected image side of the first optical element,
the projection lens system has a convergence point at which the image projection light converges between the first and the second optical elements, and
the partial blocking mechanism is disposed between the first and the second optical elements.

9. The projection display apparatus according to claim 8, wherein
the light sensor receives light from the second optical element.

10. The projection display apparatus according to claim 1, wherein
the light sensor includes multiple color sensors that detect the intensity of each of multiple colored lights having different hues,
the brightness restricting unit calculates the brightness of the image projection light in accordance with a predetermined correspondence relationship according to the detection results from the multiple color sensors, and
the projection display apparatus further includes a color balance adjuster configured to adjust color balance of the image projection light according to the detection results by the multiple color sensors.

11. The projection display apparatus according to claim 1, wherein
the brightness restricting unit executes calibration at predetermined timing to normalize the detection result by the light sensor using the brightest value of detection results before the calibration.

12. The projection display apparatus according to claim 1, wherein
the brightness restricting unit controls the upper limit of brightness of the image projection light through feedback control of the brightness detected by the light sensor.

* * * * *